United States Patent [19]
Sjostrom et al.

[11] Patent Number: 6,028,270
[45] Date of Patent: Feb. 22, 2000

[54] NONINVASIVE MASS DETERMINATION STOCKPILED MATERIALS

[75] Inventors: Keith J. Sjostrom, Clinton; Dwain K. Butler, Vicksburg, both of Miss.

[73] Assignee: The United States of America as represented by the Army Corps of Engineers, Washington, D.C.

[21] Appl. No.: 09/173,674

[22] Filed: Oct. 16, 1998

[51] Int. Cl.$^7$ .............................. G01G 9/00; G01M 1/12; G01B 11/00; G01B 11/28
[52] U.S. Cl. .......................... 177/1; 73/382 R; 73/382 G; 172/1; 33/1 V; 356/379
[58] Field of Search ...................... 172/1, 2, 4.5; 701/50; 177/1, 264; 73/382 R, 382 G; 356/379, 380; 33/1 V

[56] References Cited

U.S. PATENT DOCUMENTS

| | | | |
|---|---|---|---|
| 4,399,693 | 8/1983 | Gournay | 73/382 R |
| 5,001,634 | 3/1991 | Nordin | 73/382 G |
| 5,218,864 | 6/1993 | Pennybaker | 73/382 R |
| 5,502,898 | 4/1996 | Manore | 33/1 V |
| 5,553,407 | 9/1996 | Stump | 701/50 |

*Primary Examiner*—Randy W. Gibson
*Attorney, Agent, or Firm*—Luther A. Marsh

[57] ABSTRACT

The mass of stockpiled materials is determined from detailed measurements of the elevation of the pile surface at many points and the measurement of the gravitational field along several profile lines across the surface of the stockpiled material. The elevation measurements allow the calculation of the pile volume. Measured gravity values are adjusted using standard gravity corrections in such a manner as to imply all gravity data are collected along the same reference datum. Variations in the corrected gravity values are assumed to be caused solely by the pile material. The gravity measurements are interpreted using analytical and statistical methods to determine the volume-average bulk density value of the pile material. The pile volume is multiplied by the volume-average bulk density to obtain the weight of the stockpiled material.

3 Claims, No Drawings

NONINVASIVE MASS DETERMINATION STOCKPILED MATERIALS

GOVERNMENT INTEREST STATEMENT

The invention described herein may be manufactured, licensed, and used by or for governmental purposes without the payment of any royalties thereon.

I. BACKGROUND OF THE INVENTION

1. Field of the Invention

This invention relates to a method of determining the weight of stockpiled materials. Specifically, it provides a method of determining the volume and the volume-average bulk density of stockpiled materials, wherefrom the weight of the stockpiled materials may be calculated.

2. Prior Art

Present methods of determining the weight of stockpiles are invasive. One method requires filling a box of known volume with material withdrawn from the pile, weighing, and computing the bulk density. In another method, a hole is scooped from the pile and the hole is lined with plastic and filled with water; from the water quantity and the weight of the material scooped from the pile, the bulk density is calculated. In yet another method, holes are drilled into the pile in an effort to obtain undisturbed samples of the material; the samples are weighed, measured, and the bulk density is computed. None of these methods are entirely satisfactory because they entail large errors in the bulk density determination and great difficulty in handling small particulate matter and any voids among the large, dense, and hard materials and boulders.

The present invention provides a novel, noninvasive method of determining the weight of stockpiled material using microgravity measurements, which overcomes the drawbacks of prior-art techniques. Weight determinations using microgravity measurements have been described in the papers authored by (Butler, D. K., September 1980; Sjostrom, K. J. and Butler, D. K., August 1996; Sjostrom, K. J. and Berry, T., December 1996; and Sjostrom, K. J., August 1997.

II. SUMMARY OF THE INVENTION

This invention provides a novel, nonintrusive method of determining the weight of stockpiled materials. This method determines the volume of the stockpile by elevation measurements on the surface of the pile, and a representative bulk density from precise measurements of the gravitational field with highly sensitive apparatus. Multiplication of the volume and the bulk density yields the weight of the stockpile.

The method of this invention is useful for determining the mass of piles of heavy metal ores wherein the particle size may range from fines (under 1 mm particle diameter) to large boulders, as well as construction materials and any other types of stockpiled materials.

III. DETAILED DESCRIPTION OF THE INVENTION

In the method of this invention, the volume of the stockpiled materials is determined by elevation measurements on the surface of the pile at as many measurement points necessary to accurately determine the geometry of the pile surface. The accuracy of the horizontal measurement points with respect to a set reference point is of the order of 2.5 to 5.0 cm, and the measurement accuracy of elevation is of the order of 0.3 cm. Conventional land surveying techniques are used for these determinations. All ridges, depressions, bulges, and slopes of the pile are accurately characterized. The elevations of the pile surface are used to form a three-dimensional (3-D) model of the pile surface. A two-dimensional (2-D) planar surface is derived through the elevation points along the toe of the pile. The region between the three-dimensional pile surface and the planar surface is the computed pile volume.

The bulk density of the material in the pile is determined by a program of measurements of the gravitational field above the pile. Measurements are acquired along 2 to 5 profile lines, depending on the length of the long axis of the pile, with a spacing of measurement points along the profile lines from 3 to 6 m depending on the pile width. Measurement accuracy of ±5 microGals or better is required. (1 microGal=$10^{-8}$ m/sec$^2$). All gravity and elevation measurements along the profile lines are referenced to a base station positioned at the beginning of each line. Measurements of gravitational field strength with great accuracy are referred to as "microgravity measurements."

A profile line is a straight-line path across the top of the pile. For elongated piles, the profile lines are oriented approximately perpendicular to the long axis of the pile with two, three, or four profiles crossing the pile. Along each profile line there is a plurality of measurement points, typically 15–20. The elevations measurement are characterized by ridges, depressions etc of the surface of the pile The base of each pile is defined by a plane passing through the points at the bottom of the pile which is referred to as base station. These measured points are used to develop a numerical model representation of the pile. For more conical shaped piles, profile lines are oriented so as to intersect at the apex of the pile.

Gravity readings along each profile line are acquired in a two-phase measurement program. Following initial gravity readings at the base station, the first measurement program consists of acquiring measurements at each measurement station up the slope of the pile, stopping at a measurement point located near the crest of the stockpile, often the highest elevation along the profile. Once the reading at the top of the pile is recorded, the gravity survey loops back to the base station on the same side of the pile for additional readings to conclude the first program. The second program starts at the opposite end of the line from the base station and proceeds up the back side of the pile. Gravity readings are collected until the crest is again reached. After recording the gravity value at the crest, the survey returns to the base station for the third and final set of readings. The two-phase measurement program with multiple base station readings are required to compensate for instrument drift and normal gravity variations at the site over the time span required for the survey. The strategy for acquiring gravity measurements outlined here is preferred. However, this invention is not limited to the precise details of this strategy.

Measured gravity values are corrected in such a manner as to ensure that all gravity data are related to the same reference values at the base station by applying gravity corrections for the effects due to latitude, elevation, topography, and earth tides. In this manner, variations in the corrected gravity values are assumed to be caused solely by the pile material. Corrected gravity values determined along each profile line are interpreted using analytical and statistical methods to determine a volume-average bulk density value of the pile material. Corrections to microgravity data are required in order to compensate for normal gravity variations at the site over the time span required for the survey. Measured values are corrected in such a manner as to imply that all gravity data are collected along the same reference datum by implementing gravity corrections for the effects due to latitude, elevation, topography, earth tides, and instrument drift. After applying these corrections, variations in the corrected gravity values are assumed to be caused only by the ore stockpile being studied. The normal gravity variations and compensating corrections applied to microgravity data are discussed in brief below.

Corrections for time variations. Gravity values over the survey area change with time because of earth tide effects and instrument drift. Earth tides, like ocean tides, are caused by the orientation of the sun and moon and are of sufficient amplitude to be detected by sensitive gravity meters. Instrument drift is caused by creep of the metal components in the meter due to thermal expansion or excessive movement. Over short time periods (less than 60 minutes), drift due to tidal and instrument fluctuation can be assumed to be linear over time. The usual procedure for correcting for drift is to reoccupy a base station frequently and assume that the gravity values at all stations in the survey area vary in the same manner as those between readings at the base station. Differences in gravity values at the base station are plotted with respect to time to produce a drift curve. The drift correction, denoted as $\Delta g_D$, for each station is determined directly from the graph. Positive drift requires a negative correction-and vice-versa.

Latitude correction. Both the rotation of the earth and its non-spherical shape produce a change in gravity values as a function of latitude. For microgravity surveys, it is sufficient to assign a reference latitude to the base station and use Equation (1) to compute latitude corrections for all other stations. The latitude correction, denoted as $\Delta g_L$, is:

$$\Delta g_L = "(0.25 \times sin(2\Phi) \, \mu Gal/ft) \times \Delta s \text{ (for } \Delta s \text{ in ft) or} \quad (1)$$

$$\Delta g_L = "(0.81 \times sin(2\Phi) \, \mu Gal/m) \times \Delta s \text{ (for } \Delta s \text{ in m)},$$

where $\Delta s$ is the north-south distance (in feet) between the measurement location and base station and $\Phi$ is the reference latitude of the base station. The correction term is added to the measured gravity value if the station is positioned south of the base station and subtracted if located north of the base station.

Free air correction. The free air correction, denoted as $\Delta g_{FA}$, compensates for variations in gravitational attraction caused by the elevation difference between the gravity measurement station and reference datum. The correction is added to the measured gravity value if the station elevation is greater than the reference elevation because the gravitational attraction decreases with increasing elevation, and vice versa. The free air correction formula is:

$$\Delta g_{FA} = "94.041 \, \mu Gal/ft \times \Delta h \text{ (for } \Delta h \text{ in ft), or} \quad (2)$$

$$\Delta g_{FA} = "308.55 \, \mu Gal/m \times \Delta h \text{ (for } \Delta h \text{ in m)},$$

where $\Delta h$ is the difference in elevation between the measurement station and reference elevation of the base station.

Bouguer correction. The Bouguer correction compensates gravity values affected by differing masses of material beneath the measurement stations caused by elevation variations. The ore material between the reference elevation of the base station and the elevation of a measurement station is approximated by an infinite horizontal slab with density equal to that of the material beneath the station. The correction, denoted as $\Delta g_B$ is calculated using:

$$\Delta g_B = "(12.77 \times \rho \, \mu Gal/ft) \times \Delta h \text{ (for } \Delta h \text{ in ft), or} \quad (3)$$

$$\Delta g_B = "(41.91 \times \rho \, \mu Gal/m) \times \Delta h \text{ (for } \Delta h \text{ in m)},$$

where $\rho$ is the material density (in g/cm$^3$) and $\Delta h$ is the elevation difference (in feet) between the measurement point and base station. The quantity $\Delta g_B$ is subtracted from the measured gravity value if the station elevation is greater than the reference elevation, and vice versa.

After all of the corrections have been applied to the observed gravity data, the result is the Bouguer gravity value, denoted as $g_B$. The Bouguer gravity value at a measurement station is given by $$g_B = g_{obs} \pm \Delta g_L \pm \Delta g_{FA} \pm \Delta g_B \pm \Delta g_D, \quad (4)$$

where $g_{obs}$ is the observed gravity reading at the station and the remaining terms are the gravity corrections discussed above. Subtracting the gravity readings recorded at the base station, denoted as $g_{base}$, from the Bouguer gravity values at each station using the equation $$\Delta g_{BA} = g_B - g_{base} \quad (5)$$

results in the Bouguer gravity anomaly $\Delta g_{BA}$. The Bouguer gravity anomaly is used in determining the density of the ore pile material.

Determination of Bulk Material Density

In standard gravity surveying to investigate geologic structure, the Bouguer corrections in the correction of gravity data requires knowledge or assumption of the average density of the near-surface rock and sediments. However, the premise of the invention is to compute the material density values from the microgravity readings. Three methods were investigated to determine the bulk density of the stockpiled materials. The first method, known as Nettleton's method, is an indirect, empirical technique to determine density. A plot of the observed gravity values that have undergone the drift, latitude, and free air corrections, versus distance along the survey line is strongly correlated to the shape of the measured topography over the pile. When the Bouguer correction is applied using a range of material density values, the density value that produces a resultant gravity anomaly that least correlates with the topography is the correct bulk density value for the pile (mathematically this is equivalent to determining the density which produces a correlation coefficient of zero between Bouguer anomaly and topography).

The second method is an analytical approach similar in concept to the first method. Expanding Equation 5 to include the observed gravity readings and all of the gravity correction terms and then solving for the density D gives $$\rho = \frac{[g_{obs} - g_{base} + (\pm \Delta g_L \pm \Delta g_{FA} \pm \Delta g_D)] - \Delta g_{BA}}{41.91 \times \Delta h} \quad (6)$$

where $\rho$ is in g/cm$^3$ and $\Delta h$ is in m. To solve for the mean (average) bulk density value, the Bouguer gravity anomaly, is assumed to be a random error with a mean value equal to zero. The density is then determined as the slope of a least squares best-fitting straight line to the data points and passing through the origin of a plot of the numerator versus the denominator of Equation (6) (with <$\Delta g_{BA}$>=0, where < > signifies mean value).

The third method used for determination of the bulk material density of stockpile is a two-and-a-half dimensional gravity modeling computer program. Theoretical gravity values are calculated for the pile by inputting various estimates of the material density into the gravity modeling algorithm. The best density estimate is that value which provides the lowest least squares error between the observed and calculated gravity data. This method is much more cumbersome and time consuming than the first two methods, however, the advantage of this method is that it allows investigation of possible ore material settlement below the pile bottom reference surface. The bulk material density value determined by this procedure has an accuracy of 0.2 g/cm$^3$ (12.5 lb/ft$^3$) or better. The volume of the pile is multiplied by the average bulk material density to yield the weight of the pile of material.

While this invention has been described in terms of a specific embodiment, it is understood that it is capable of further modification and adaption of the invention following in general the principle of the invention and including such departures from the present disclosure as come within the known or customary practice in the art to which the invention pertains and may be applied to the central features set forth, and fall within the scope of the invention and of the limits of the appended claims.

We claim:

1. A method of determining the weight of stockpiled materials comprising the steps of:

(a) determining the elevation of the pile surface at a plurality of points and constructing a three-dimensional elevation surface model;

(b) defining a two-dimensional planar surface through the elevation points along the toe of the pile;

(c) calculating the volume of the stockpiled material from the region defined between the two-dimensional planar surface and the three-dimensional elevation surface model;

(d) measuring the gravitational field at the surface of the pile along predetermined profile lines and at predetermined spacings along the profile lines using a gravimeter according to a prescribed measurement progam;

(e) adjusting gravitational field measurements by reference to a base station and making gravity corrections for the effects of latitude, elevation, topography, and earth tides:

(f) interpreting gravity values determined along the profile lines by analytical and statistical methods to determine a volume-average bulk density value of the pile material; and (h) multiplying the pile volume by the volume-average bulk density; whereby the weight of the stockpiled materials is obtained.

2. The method of claim 1 wherein the horizontal accuracy of the elevation measurement points are 2.5 to 5.0 cm and the vertical accuracy of the measurements is of the order of 0.3 cm.

3. The method of claim 1 wherein the measurement spacing of along profile lines for gravitational field determinations is from 3 to 6 m and the gravity measurement accuracy is ±5 microGals.

* * * * *